United States Patent [19]

Imamura et al.

[11] Patent Number: 5,495,277
[45] Date of Patent: Feb. 27, 1996

[54] IMAGE SENSOR HAVING A FIRST LIGHT RECEPTOR SUBSTRATE AND A SUBSTRATE WITH ELECTRONICS MOUNTED AGAINST THE FIRST SUBSTRATE

[75] Inventors: Masaya Imamura; Kensuke Sawase; Seiji Koshikawa, all of Kyoto, Japan

[73] Assignee: Rohm Co., Ltd., Kyoto, Japan

[21] Appl. No.: 942,763

[22] Filed: Sep. 9, 1992

[30] Foreign Application Priority Data

Sep. 30, 1991 [JP] Japan ..................................... 3-250091

[51] Int. Cl.$^6$ .......................... H04N 1/024; H04N 1/028; B41J 2/32
[52] U.S. Cl. .......................... 347/171; 358/296; 358/471; 358/472; 250/208.1
[58] Field of Search ...................... 346/76 PH; 358/296, 358/471, 472; 250/208.1; 347/200

[56] References Cited

U.S. PATENT DOCUMENTS

| | | | |
|---|---|---|---|
| 4,682,042 | 7/1987 | Igarashi .................................... | 250/578 |
| 4,733,098 | 3/1988 | Seito et al. ............................... | 250/578 |
| 4,873,579 | 10/1989 | Kubota et al. .......................... | 358/471 |
| 4,940,888 | 7/1990 | Nagata et al. .......................... | 358/471 |
| 5,014,135 | 5/1991 | Ijuin et al. ............................. | 346/76 PH |
| 5,038,027 | 8/1991 | Ioka .................................... | 250/208.1 |
| 5,126,859 | 6/1992 | Yoshinouchi et al. .................. | 358/471 |
| 5,142,137 | 8/1992 | Kushino et al. ...................... | 250/208.1 |
| 5,254,847 | 10/1993 | Hata et al. ............................ | 250/208.1 |
| 5,434,681 | 7/1995 | Imamura et al. ...................... | 358/471 |

FOREIGN PATENT DOCUMENTS

| | | |
|---|---|---|
| 0239955 | 10/1987 | European Pat. Off. . |
| 0402860 | 12/1990 | European Pat. Off. . |
| 0457623 | 11/1991 | European Pat. Off. . |
| 0465768 | 1/1992 | European Pat. Off. . |
| 1-289279 | 11/1989 | Japan . |
| 0268563 | 11/1990 | Japan . |
| 0268564 | 11/1990 | Japan . |
| 0268565 | 11/1990 | Japan . |

*Primary Examiner*—Huan H. Tran
*Attorney, Agent, or Firm*—Wolf, Greenfield & Sacks

[57] ABSTRACT

In an image sensor having, in a frame equipped with a transparent cover engageable with an objective, a light emitter for radiating light over the objective, an optical system for condensing light reflected from the objective and for directing the light to a predetermined position, a light receptor for receiving the light directed by said optical system, electronic elements constituting the light receptor are mounted on a long substrate, and other electronic elements are mounted on a single short substrate, which is attached to the long substrate at a portion other than the portion where the light receptor is mounted. This image sensor can be assembled in a reduced number of steps, preventing soldering flux from flying to the light receptor.

33 Claims, 7 Drawing Sheets

IMAGE SENSOR HAVING A FIRST LIGHT RECEPTOR SUBSTRATE AND A SUBSTRATE WITH ELECTRONICS MOUNTED AGAINST THE FIRST SUBSTRATE

BACKGROUND OF THE INVENTION

1. Field of the Invention

This invention relates to an image sensor for a facsimile machine, an optical character reader or the like.

2. Description of the Related Art

Figure 1:
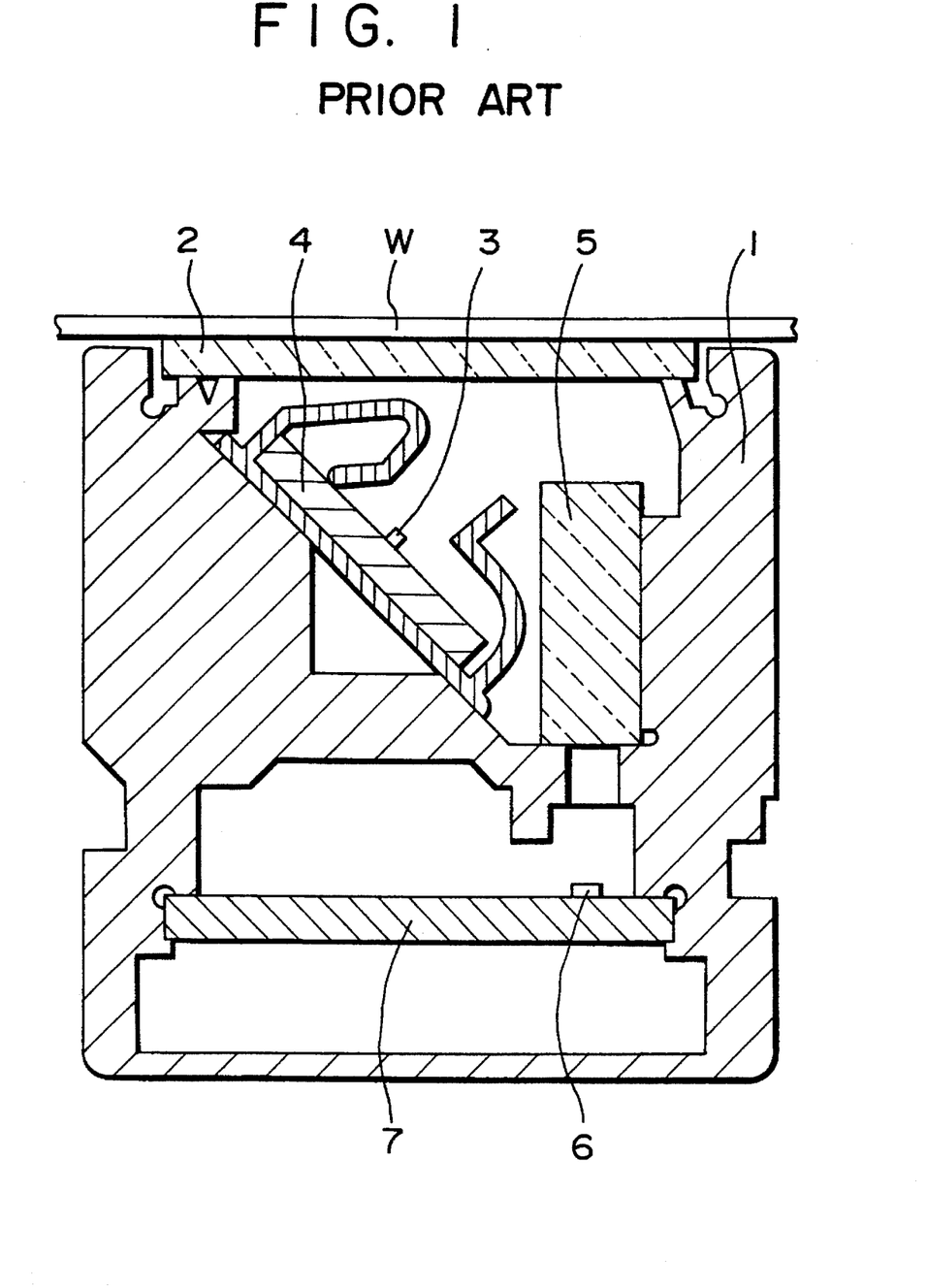
FIG. 1 is a fragmentary cross-sectional view of a conventional image sensor.

FIG. 1 of the accompanying drawings is a fragmentary cross-sectional view, taken along a plane perpendicular to the direction of scanning, of a typical conventional image sensor. In this image sensor, a transparent cover (glass cover) 2 is mounted on the top of a frame 1, and there are mounted in the frame a first substrate 4 with a light emitting element 3 for radiating light over an original W as an objective engageable with the glass cover 2, a rod lens array 5 as an optical system for condensing light reflected from the original W, and a second substrate 7 with a light receptor 6 for receiving the light through the rod lens array 5.

With this conventional image sensor, light from the light emitting element 3 is radiated over the original W, which is brought into contact with the glass cover 2 by a platen roller (not shown), at an angle of about 45° with respect to the plane of the glass cover 2. The light reflected by the original W perpendicularly to the plane of the glass cover 2 is condensed by the rod lens array 5 and is then received by the light receptor 6 which is situated directly under the rod lens array 5 where the resulting light is converted into electrical signals.

In the conventional image sensor, in order to detect the light reflected from the original W, there are mounted on the second substrate 7 a package of electronic elements (not shown) such as resistors and capacitors in addition to the light receptor 6. These electronic elements are usually connected respectively to their associated pads on the second substrate 7 by soldering.

However, as many soldering operations as there are electronic element terminals are needed, which would take a very long time and hence would increase the cost of production. The more terminals there are to be soldered, the greater the amount of soldering flux, which is widely used in soldering, will become so that the electronic elements can be easily :affected. More particularly, if soldering flux flies to the light receptor, the light receptor would be deteriorated to cause the image sensor to malfunction. To avoid this problem, in the conventional art, terminals are connected by using silver paste, which would increase the cost of production. To prevent flux from flying to the light receptor, in the image sensor disclosed in Japanese Patent Laid-Open Publication No. HEI 1-289279, electronic elements are soldered to the substrate at one surface other than that where the light receptor is mounted. Yet this method is disadvantageous in that a preheater block cannot be brought into contact with the rear surface of the substrate and that it is impossible to reduce time taken to solder.

SUMMARY OF THE INVENTION

It is therefore an object of this invention to provide an image sensor which can reduce the cost and time needed in soldering and which will not affect the characteristics of electronic elements.

According to the invention, there is provided an image sensor adapted to be used in an electronic equipment such as a printer, a word processor, a facsimile machine or a plotter and having a frame to which a transparent cover engageable with an objective whose image is to be picked up is to be attached, the image sensor comprising: a light emitter mounted in the frame for radiating light over the objective; an optical system mounted in the frame for condensing light reflected from the objective and for directing the light to a predetermined position; a light receptor mounted in the frame for receiving the light directed by the optical system; a long substrate on which the light receptor is mounted; and a short substrate on which electronic elements except those constituting the light receptor are mounted, the short substrate being mounted on the long substrate at a position other than that where the receptor is mounted.

With this arrangement, it is only necessary to solder the terminals of the short substrate on which necessary electronic elements are previously mounted, thus reducing the number of terminals to be soldered and the amount of soldering flux.

The short substrate is the one on which the electronic elements other than the light receptor mounted on the long substrate are to be mounted; if the long substrate has enough space for the electronic elements other than the light receptor, the short substrate should by no means be limited to a specific form. For example, it may be a surface mount type or a single or dual in line, selected depending on the structure of the image sensor. In view of the wiring of various electronic elements on the short substrate, it is preferable to use a hybrid substrate as the short substrate. Further, it is preferable to form reference holes on both the short and long substrates to assist in positioning the short substrate in a predetermined position. Particularly during soldering, partly since it is difficult to position the surface mount type short substrate on the predetermined position of the long substrate and partly since the light receptor can be damaged, the reference holes are effective in the case of using a surface mount type short substrate.

Further, the short substrate may be mounted on either the upper surface or the lower surface of the long substrate; if the short substrate is to be mounted on the lower surface of the long substrate, the long substrate must be a double-surface substrate.

DETAILED DESCRIPTION

Figure 2:
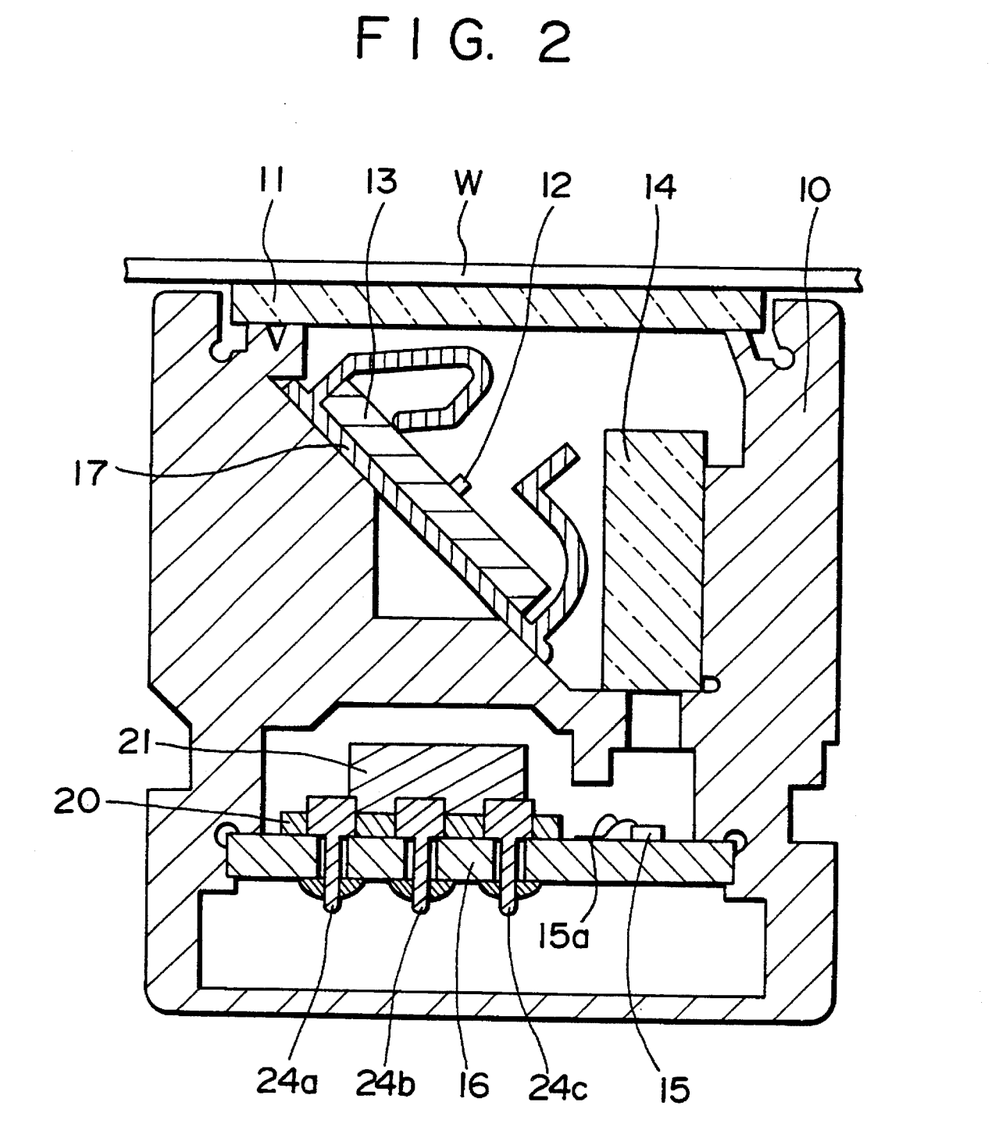
FIG. 2 is a fragmentary cross-sectional view according to a preferred embodiment of this invention.

The principles of this invention are particularly useful when embodied in an image sensor such as shown in FIG. 2.

The image sensor comprises a frame 10, a glass cover 11 mounted on the top of the frame 10, a first substrate 13 on which a light emitter 12 is mounted near its central portion, and a second substrate 16 on which a light receptor 15 is mounted at its lower portion. The first substrate 13 is fixedly supported obliquely with respect to the glass cover 11 by a support strip 17. A rod lens array 14 is disposed in and secured to the frame 10 perpendicularly to the glass cover 11 and the second substrate 16, having an optical axis extending vertically.

In this image sensor, the light emitted from the light emitter 12 is radiated over an original W, which is brought into contact with the glass cover 11 by a platen roller (not shown), at an angle of about 45° with respect to the plane of the glass cover 11. The light reflected on the original W perpendicularly to the glass cover 11 is condensed by the rod lens array 14 and is then received on the light receptor 15 where the light is converted into electrical signals, the light receptor 15 being disposed right under the rod lens array 14.

As a feature of this invention, a short hybrid substrate 20 on which electronic elements except the light receptor 15 are previously mounted is attached to the long substrate 16.

The terminals of the short hybrid substrate 20 may be connected with the terminals of the long substrate 16 by the conventional method such as by using solder or silver paste.

Figure 3:
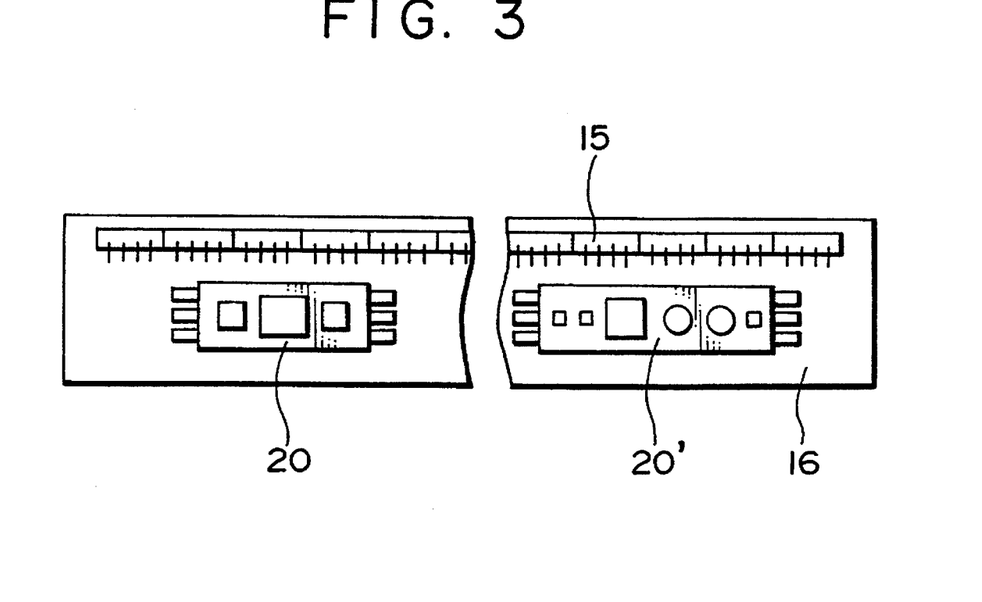
FIG. 3 is a plan view, with parts omitted, of substrates of the image sensor of FIG. 2.

In this embodiment, since the light receptor 15 is attached to the long substrate 16 in a wiring pattern by wire-bonding and is coated by epoxy resin, the single or dual in line type hydrid substrate 20 is soldered. Reference numeral 15a in FIG. 2 designates a wire. As shown in FIG. 3 which is a plan view of the long substrate 16, a certain number (e.g., three) of hybrid substrates 20, 20' are mounted in a space devoid of the light receptor 15 extending longitudinally of the long substrate 16. It is therefore possible to remarkably reduce the soldering frequency needed when attaching the electronic elements other than the light receptor onto the long substrate.

Figure 4:
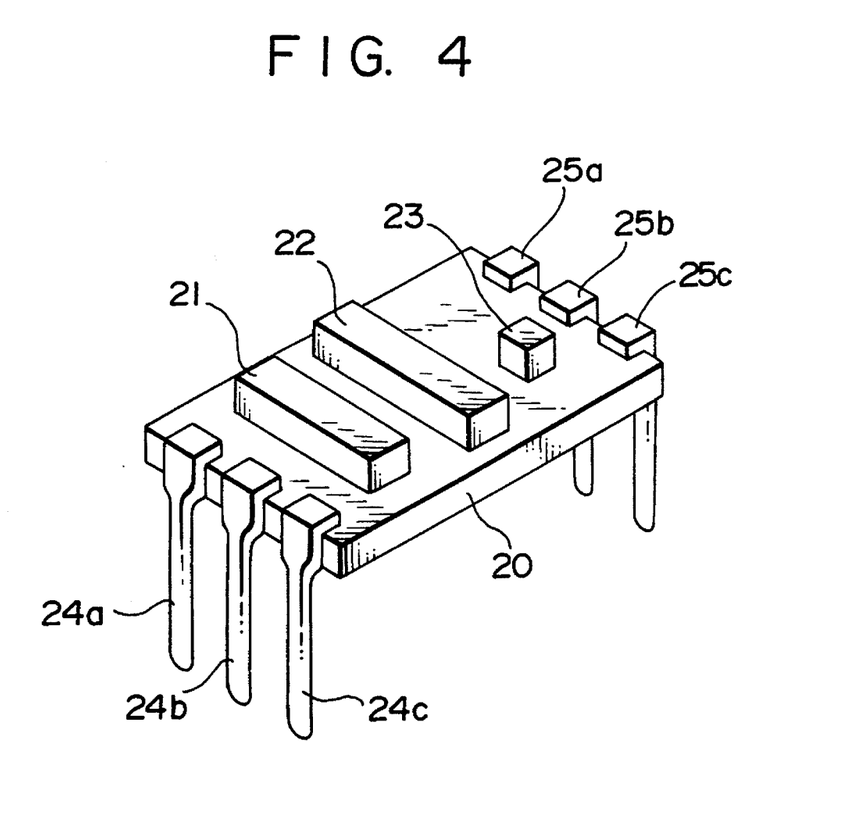
FIG. 4 is a perspective view of a dual in line type hybrid substrate.

FIG. 4 shows one example of the dual in line type hybrid substrate 20 of FIG. 2. On this short substrate 20, various electronic elements 21 through 23 are mounted, with three terminals 24a through 24c and 25a through 25c extending from each side of the short substrate 20. These terminals are inserted through the through-holes previously formed in the long substrate 16 at predetermined positions and are then soldered, thus connecting the hybrid substrate 20 to the long substrate 16.

Figure 5:
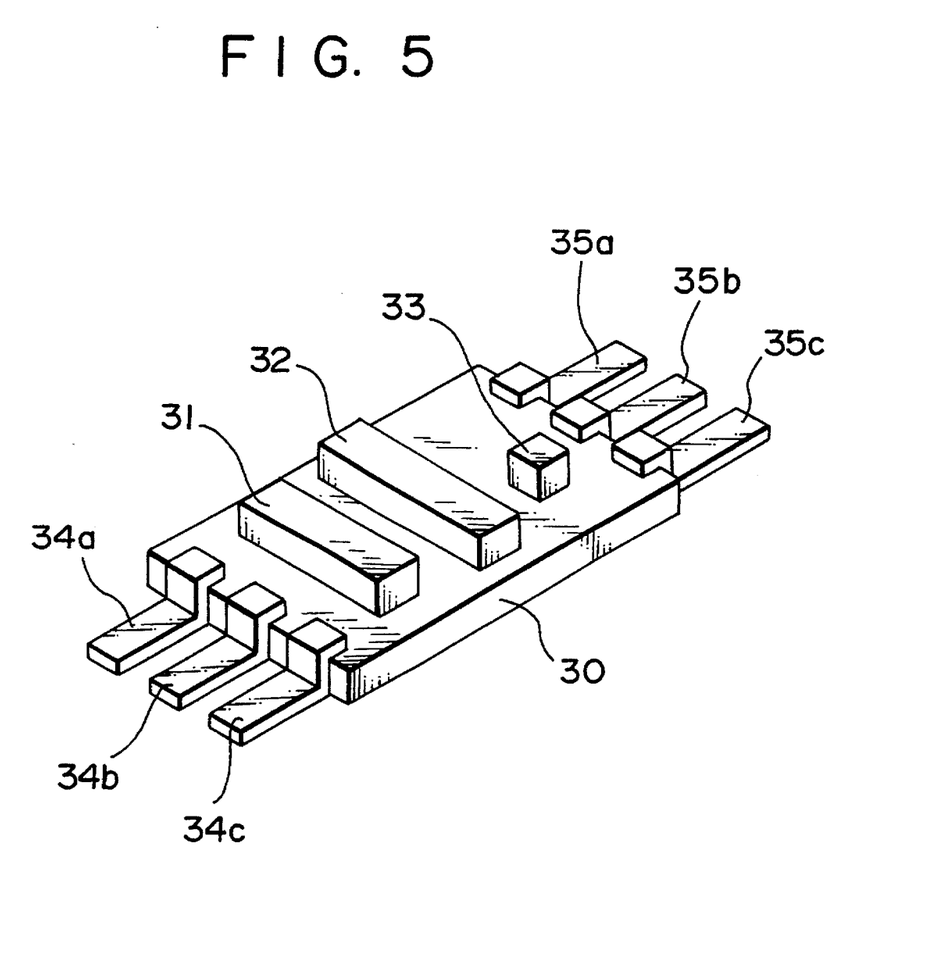
FIG. 5 a perspective view of a surface mount type hybrid substrate.

FIG. 5 shows a surface mount type hybrid substrate 30. This short substrate 30 also has electronic elements 31 through 33 and is provided with terminals 34a through 34c and 35a through 35c on each side. These terminals are soldered in a predetermined wiring pattern directly on the long substrate 16.

Figure 6:
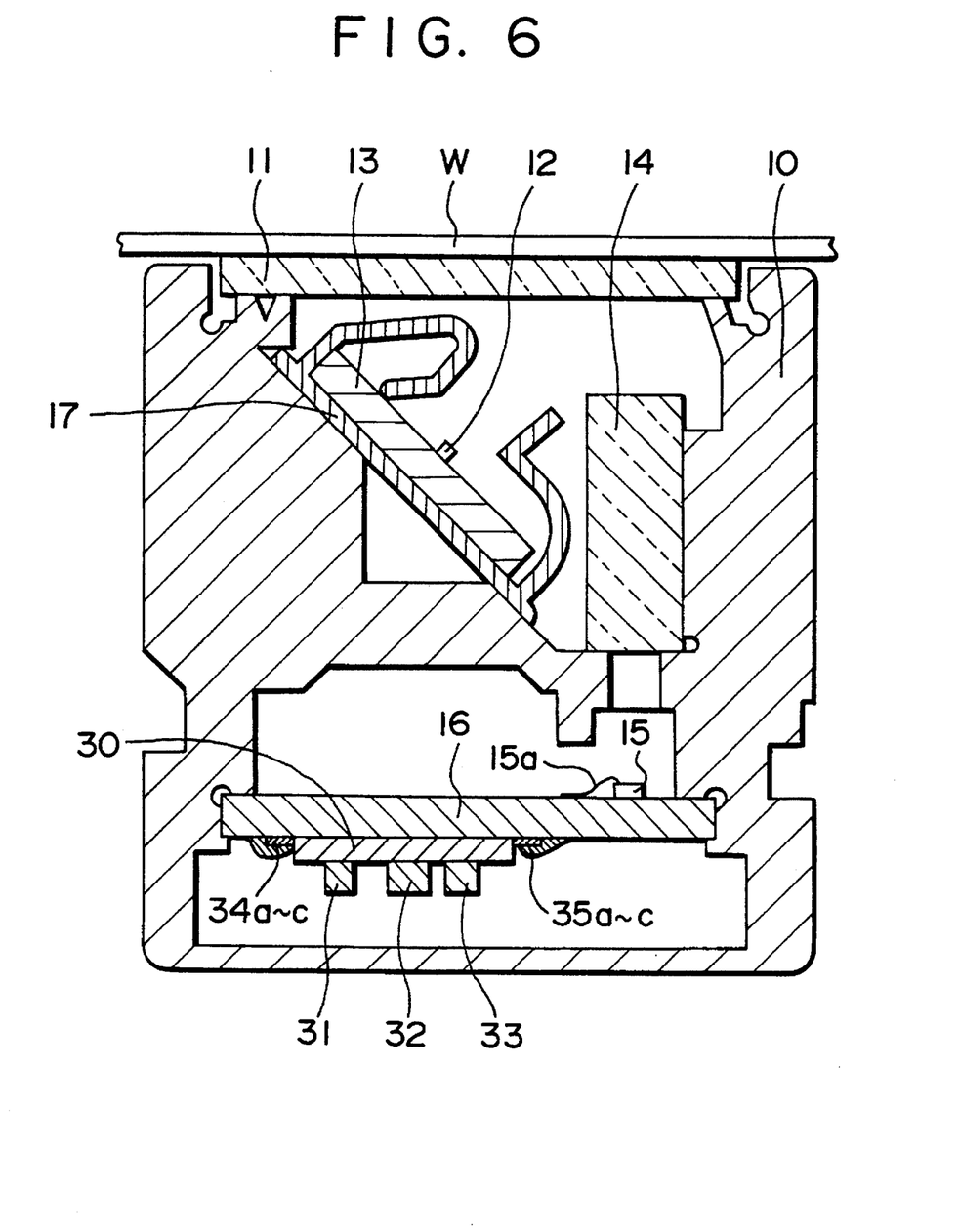
FIG. 6 is a fragmentary cross-sectional view showing the image sensor in which the hybrid substrate is mounted on the rear surface of a main substrate.

FIG. 6 shows an embodiment in which the surface mount type hybrid substrate 30 of FIG. 5 is attached to the long substrate 16. In this case, the long substrate 16 is a double-face substrate. In FIG. 6, the terminals 34a through 34c and 35a through 35c of the hybrid substrate 30 are attached to the under side of the long substrate 16 by soldering. Since the long substrate 16 is a double-face substrate, the electronic elements 31 through 33 on the hybrid substrate 30 can be connected with the light receptor 15 in this state. Since the surface mount type hybrid substrate 30 is attached to the double-face substrate 16 at a surface opposite to the surface on which the light receptor 15 is attached, it is possible to reduce the risks that soldering flux might fly to the light receptor 15.

Figure 7:
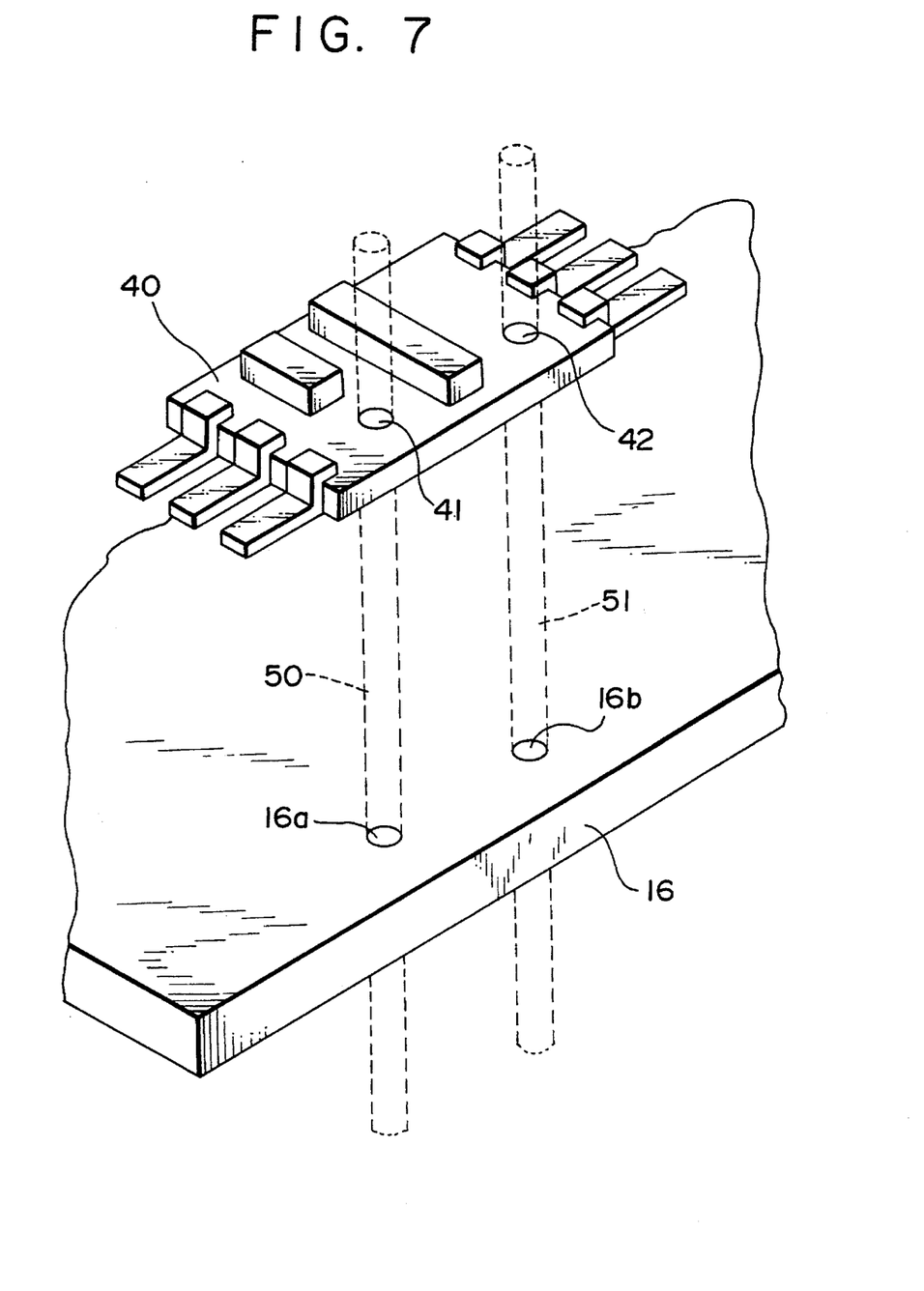
FIG. 7 shows the manner in which the surface mount type hybrid substrate is mounted exactly on the main substrate.

In the case of a surface mount type short substrate, during soldering, it is difficult to position the short substrate on the long substrate 16 at a predetermined position and the light receptor 15 would occasionally be damaged. To this end, as shown in FIG. 7, two reference holes 41, 42 are formed in a hybrid substrate 40 a suitable distance apart, and likewise two reference holes 16a, 16b are formed in the long substrate 16 at the corresponding positions. In this case, as reference pins 50, 51 projecting from a jig (not shown) are inserted through the reference holes 16a, 16b and also the reference holes 42, 41 of the hybrid substrate 40, it is possible to position the substrate 40 easily without damaging the light receptor 15.

By soldering the hybrid substrate, either the signal or dual in line type hybrid substrate 20 or the surface mount type hybrid substrate 30, to the long substrate 16 at a surface opposite to the surface on which the light receptor 15 is mounted, it is possible to prevent soldering flux from flying to the light receptor 15, thus securing the function of the image sensor itself.

With the image sensor of this invention, since the electronic-element-mounted short substrate is attached to the long substrate at a portion other than the portion where the light receptor is mounted, the following results can be achieved:

(1) Since some electronic elements to be attached to the long substrate can be mounted as a unit on the short substrate, it is possible to automate the mounting of the short substrate on the long substrate and hence to reduce the cost of production.

(2) Since only as many terminals as are possessed by the short substrate must be soldered, which are fewer than usual, it is possible to shorten the soldering time.

(3) Since the amount of soldering flux to be used can be reduced in response to reduction of the number of terminals to be soldered, the electronic elements would hardly be affected.

(4) Since the short substrate on which some electronic elements are mounted is attached to the long substrate at a spare space, it is possible to realize a compact-size image sensor.

(5) Since the assembling of the image sensor itself can be performed with the mounting of electronic elements on the short substrate, it is possible to improve the working efficiency.

Figure 8:
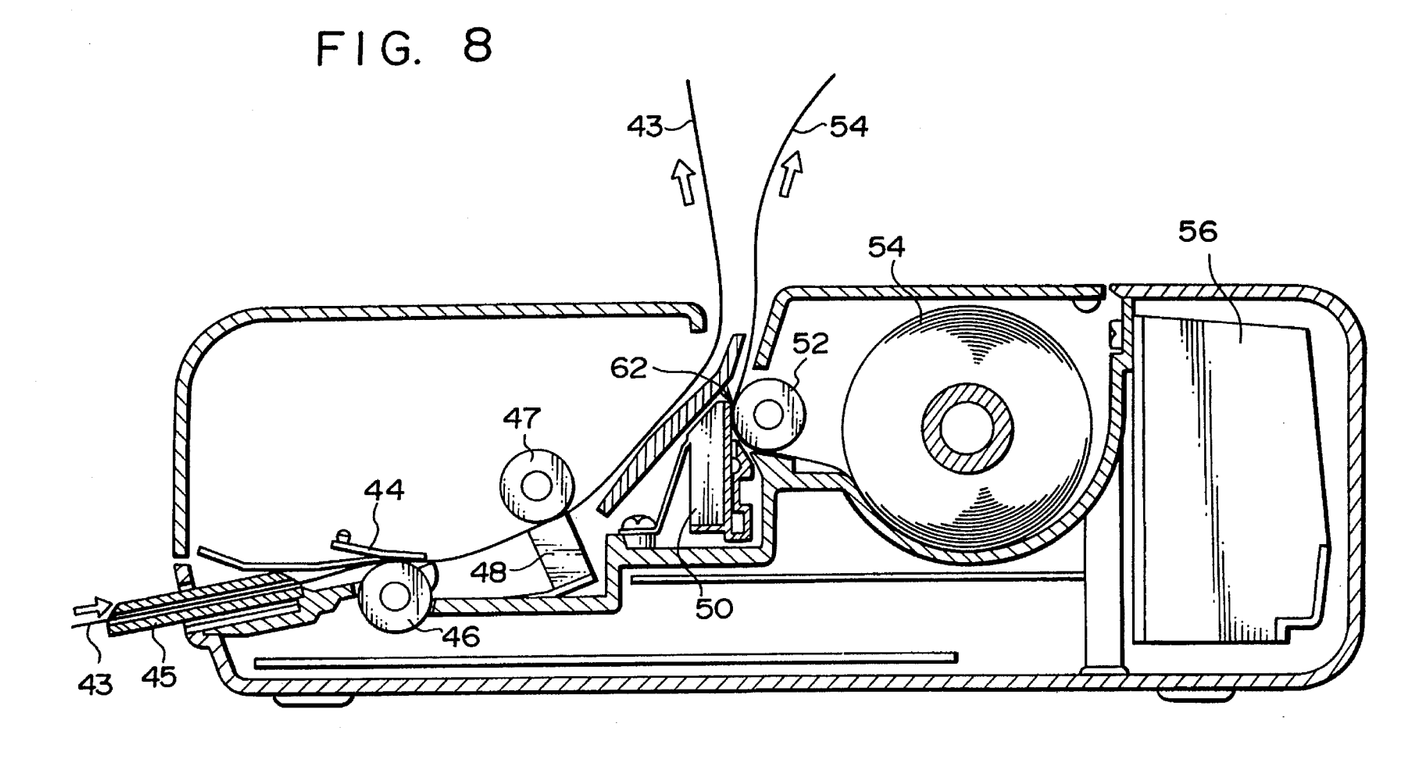
FIG. 8 is a cross-sectional view of a printer in which the image sensor of this invention is incorporated.

FIG. 8 shows a printer, such as for a facsimile or copying machine, which is equipped with the image sensor of this invention. This printer comprises an inlet 45 through which a document 43 is to be inserted, a roller 46 for feeding the document 43, an image sensor 48 for reading the content of the document 43, a printing unit 50, and a platen roller 52 contiguous to the printing unit 52. The content of the document 43 is printed on a recording paper 54. As a plurality of documents 43 are inserted from the inlet 45, they are separated into individuals by a separator 44 and are fed successively to the image sensor 48. In the image sensor 48, a pattern on the surface of the individual document 43 is converted into electrical signals, based on which printing is made on the recording paper 54 in the printing unit 50. The printing unit 50 is equipped with a thermal head, using an ink ribbon 62. The image sensor 48 is identical with the image sensor used in,the foregoing embodiments. Since the image sensor itself is inexpensive and compact and will rarely encounter faults, the whole printer of FIG. 8, which includes the image sensor, is also inexpensive and will be with fewer faults, thus improving the performance of the printer.

What is claimed is:

1. An image sensor for use in an electronic machine, the sensor having a frame and a transparent cover engageable with an objective, said image sensor comprising:

(a) a light emitter mounted in the frame for radiating light to the objective;

(b) an optical system mounted in the frame for condensing light reflected from the objective and for directing the light reflected from the objective to a predetermined position;

(c) a light receptor mounted in the frame for receiving the light directed by said optical system;

(d) a long substrate having a first side on which said light receptor is mounted; and (e) a short substrate on which electronic elements except those constituting said light receptor are mounted, said short substrate being mounted against the first side of said long substrate at a position other than where said receptor is mounted so that the short substrate covers part of the first side of the long substrate.

2. A image sensor for use in an electronic machine, the sensor having a frame and a transparent cover engageable with an objective, said image sensor comprising:

a light emitter mounted in the frame for radiating light to the objective;

an optical system mounted in the frame for condensing light reflected from the objective;

a light receptor mounted in the frame for receiving the condensed light from said optical system;

a long substrate on which said light receptor is mounted; and a short substrate on which electronic elements except those constituting said light receptor are mounted, said short substrate being mounted to said long substrate at a position other than where said receptor is mounted, wherein said short substrate is a dual in-line type, said short substrate lying in a plane and having terminals extending perpendicular to said plane.

3. An image sensor for use in an electronic machine, the sensor having a frame and a transparent cover engageable with an objective said image sensor comprising:

a light emitter mounted in the frame for radiating light to the objective;

an optical system mounted in the frame for condensing light reflected from the objective;

a light receptor mounted in the frame for receiving the condensed light from said optical system;

a long substrate on which said light receptor is mounted; and a short substrate on which: electronic elements except those constituting said light receptor are mounted, said short substrate being mounted to said long substrate at a position other than where said receptor is mounted, wherein said short substrate is a surface mount type, said short substrate lying in a plane and having terminals extending away from the substrate in a direction parallel to said plane.

4. An image sensor having a frame, the sensor comprising:

a light emitter mounted in the frame for directing light to an object;

a light receptor for receiving light reflected from the object;

a long substrate mounted in the frame, the light receptor being positioned on the long substrate, said long substrate having at least one hole;

a short substrate mounted to the long substrate, said short substrate having at least one hole aligned with the at least one hole in said long substrate by having a positioning pin temporarily extending therethrough;

electronic components mounted on the short substrate and electrically coupled to the light receptor.

5. An image sensor for use in an electronic machine, the sensor having a frame and a transparent cover engageable with an objective, said image sensor comprising:

a light emitter mounted in the frame for radiating light to the objective;

an optical system mounted in the frame for condensing light reflected from the objective;

a light receptor mounted in the frame for receiving the light from said optical system;

a double-face long substrate having said light receptor mounted on a first face; and a short substrate on which electronic elements except those constituting said light receptor are mounted, said short substrate being soldered to a second face of said long substrate at a position other than where said receptor is mounted, said second face facing away from said first face.

6. An image sensor according to claim 5, wherein said short substrate is a surface mount type lying in a plane and having terminals extending parallel to said plane.

7. An image sensor according to claim 6, wherein said short and long substrates have holes through which positioning pins can be inserted for positioning said short substrate relative to said long substrate.

8. A image sensor for use in an electronic machine, the sensor having a frame and a transparent cover engageable with an objective, said image sensor comprising:

a light emitter mounted in the frame for radiating light to the objective;

an optical system mounted in the frame for condensing light reflected from the objective;

a light receptor mounted in the frame for receiving the condensed light from said optical system;

a long substrate on which said light receptor is mounted, said long substrate having a plurality of openings; and a short substrate on which electronic elements except those constituting said light receptor are mounted, said short substrate being mounted to said long substrate at a position other than where said receptor is mounted, wherein said short substrate is a dual in-line type lying in a plane and having terminals extending perpendicular to the plane through said plurality of openings in said long substrate, said terminals being soldered on said long substrate at a surface other than that where said light receptor is mounted.

9. A printing device comprising:

(A) means for feeding an objective;

(B) means for supplying printing paper;

(C) a image sensor for converting a pattern of an objective surface into electrical signals, said image sensor including:

(a) a light emitter for radiating light over the objective, (b) an optical system for condensing light reflected from the objective and for directing the light reflected from the objective to a predetermined position;

(c) a light receptor for receiving the light directed by said optical system;

(d) a long substrates having a first side on which said light receptor is mounted; and (e) a short substrate on which electronic elements except those constituting said light receptor are mounted, said short substrate being mounted on the first side of said long substrate at a position other than that where said receptor is mounted so that the short substrate covers part of the first side of the long substrate, said electronic elements including an integrated circuit; and (D) a thermal head for generating heat based on the electrical signals issued from said image sensor to print on said printing paper.

10. A printing device comprising:

(A) means for feeding an objective;

(B) means for supplying printing paper;

(C) a image sensor for converting a pattern of an objective surface into electrical signals, said image sensor including (a) a light emitter for radiating light over the objective, (b) an optical system for condensing light reflected from the objective and for directing the light reflected from the objective to a predetermined position;

(c) a light receptor for receiving the light directed by said optical system;

(d) a long substrate on which said light receptor is mounted; and (e) a short substrate on which electronic elements except those constituting said light receptor are mounted, said short substrate being mounted on said long substrate at a position other than that where said receptor is mounted, wherein said short Substrate is of a dual in-line type, said short substrate lying in a plane and having terminals extending perpendicular to said plane; and (D) a thermal head for generating heat based on the electrical signals issued from said image sensor to print on said printing paper.

11. The printing device of claim 10, wherein the long substrate has a plurality of opening, and wherein the terminals extend through the openings.

12. The printing device of claim 11, wherein the terminals are soldered to the substrate at a surface other than that where said light receptor is mounted.

13. A printing device comprising:

(A) means for feeding an objective;

(B) means for supplying printing paper;

(C) a image sensor for converting a pattern of an objective surface into electrical signals, said image sensor including (a) a light emitter for radiating light over the objective, (b) an optical system for condensing light reflected from the objective and for directing the light reflected from the objective to a predetermined position;

(c) a light receptor for receiving the light directed by said optical system;

(d) a long substrate having a first face on which said light receptor is mounted, and a second face facing away from the first face; and (e) a short substrate on which electronic elements except those constituting said light receptor are mounted, said short substrate being soldered on the second face of said long substrate at a position other than that where said receptor; and (D) a thermal head for generating heat based on the electrical signals issued from said image sensor to print on said printing paper.

14. A printing device comprising:

(A) means for feeding an objective;

(B) means for supplying printing paper;

(C) a image sensor for converting a pattern of an objective surface into electrical signals, said image sensor including (a) a light emitter for radiating light over the objective, (b) an optical system for condensing light reflected from the objective and for directing the light reflected from the objective to a predetermined position;

(c) a light receptor for receiving the light directed by said optical system;

(d) a long substrate on which said light receptor is mounted; and (e) a short substrate on which electronic elements except those constituting said light receptor are mounted, said short substrate being mounted on said long substrate at a position other than that where said receptor is mounted, said short substrate being a surface mount type, said short substrate lying in a plane and having terminals extending parallel to said plane, said terminals being soldered to the long substrate; and (D) a thermal head for generating heat based on the electrical signals issued from said image sensor to print on said printing paper.

15. The printing device of claim 11, wherein said electronic elements include an integrated circuit.

16. The printing device of claim 13, wherein said electronic elements include an integrated circuit.

17. The printing device of claim 14, wherein said electronic elements include an integrated circuit.

18. An image sensor according to claim 1, wherein said short and long substrates each have holes for receiving positioning pins extending through the holes to align said short and long substrates.

19. An image sensor according to claim 2, wherein said short and long substrates each have holes for receiving positioning pins extending through the holes to align said short and long substrates.

20. An image sensor according to claim 3, wherein said short and long substrates each have holes for receiving positioning pins extending through the holes to align said short and long substrates.

21. The image sensor of claim 1, wherein the short substrate is soldered to the long substrate.

22. The image sensor of claim 2, wherein the short substrate is soldered to the long substrate.

23. The image sensor of claim 4, wherein the short substrate is soldered to the long substrate.

24. The image sensor of claim 7, wherein the short substrate is soldered to the long substrate.

25. The image sensor of claim 4, further comprising an optical system for condensing the light reflected from the object and for providing condensed light to the light receptor.

26. The image sensor of claim 4, wherein the long substrate and said short substrate each have a plurality of holes aligned by having a plurality of positioning pins temporarily extending therethrough.

27. The image sensor of claim 4, wherein the short substrate has terminals extending through the long substrate.

28. The image sensor of claim 4, wherein the light receptor is mounted on a first surface of the long substrate and wherein the short substrate has terminals extending away from the substrate and parallel to the first surface.

29. The image sensor of claim 4, wherein the light receptor is mounted on a first side of the long substrate, and wherein the short substrate is mounted against the first side.

30. The image sensor of claim 4, wherein the light receptor is mounted on a first side of the long substrate, wherein the short substrate is mounted on a second side facing away from the first side.

31. A printing devise comprising:

means for printing based upon print signals;

an image sensor for generating Said print signals including:

a light emitter mounted in a frame for directing light to an object;

a light receptor for receiving light reflected from the object;

a long substrate mounted in the frame, the light receptor being positioned on the long substrate, said long substrate having at least one hole;

a short substrate mounted to the long substrate and having a hole aligned with the at least one hole in said long substrate by having a positioning pin temporarily extending therethrough;

electronic components electrically coupled to the light receptor and mounted to the short substrate to generate said print signals based upon light received by the light receptor.

32. The printing device of claim 31, wherein the image sensor further includes an optical system for condensing the reflected light for providing the condensed reflected light to the light receptor.

33. The printing device of claim 32, wherein the long and short substrates have a plurality of holes aligned by having a plurality of positioning pins temporarily extending therethrough.

* * * * *